(12) United States Patent
Fish (10) Patent No.: US 7,124,152 B2
(45) Date of Patent: Oct. 17, 2006

(54) DATA STORAGE DEVICE WITH DETERMINISTIC CACHING AND RETENTION CAPABILITIES TO EFFECT FILE LEVEL DATA TRANSFERS OVER A NETWORK

(75) Inventor: Wilson M. Fish, Yukon, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 521 days.

(21) Appl. No.: 10/186,828

(22) Filed: Jun. 28, 2002

(65) Prior Publication Data

US 2003/0088591 A1   May 8, 2003

Related U.S. Application Data

(60) Provisional application No. 60/335,305, filed on Oct. 31, 2001.

(51) Int. Cl.
*G06F 17/30* (2006.01)
(52) U.S. Cl. .................. 707/204; 707/10; 711/173; 711/145; 396/429
(58) Field of Classification Search ........... 711/207, 711/173; 709/217; 707/204, 10
See application file for complete search history.

(56) References Cited

U.S. PATENT DOCUMENTS

| | | | |
|---|---|---|---|
| 5,218,695 A | 6/1993 | Noveck et al. | |
| 5,404,482 A * | 4/1995 | Stamm et al. | 711/145 |
| 5,727,206 A | 3/1998 | Fish et al. | |
| 5,745,888 A | 4/1998 | Bauer et al. | |
| 5,828,876 A | 10/1998 | Fish et al. | |
| 5,881,331 A * | 3/1999 | Yamamoto | 396/429 |
| 6,289,356 B1 | 9/2001 | Hitz et al. | |
| 6,336,167 B1 | 1/2002 | Jeffries et al. | |
| 6,587,937 B1 * | 7/2003 | Jensen et al. | 711/173 |
| 6,697,846 B1 * | 2/2004 | Soltis | 709/217 |
| 6,708,265 B1 * | 3/2004 | Black | 711/207 |
| 6,732,104 B1 * | 5/2004 | Weber | 707/10 |
| 6,738,775 B1 * | 5/2004 | Asherman | 707/10 |

* cited by examiner

*Primary Examiner*—Alford W. Kindred
*Assistant Examiner*—Sheree Brown
(74) *Attorney, Agent, or Firm*—Fellers, Snider, et al.

(57) ABSTRACT

A data storage device with deterministic caching and retention capabilities to effect file level data transfers with a host device. The data storage device includes a data recording medium on which user data are stored and a data transducing head which accesses the stored data, an operating system kernel module having a virtual file system, and a deterministic caching module. A file level request issued by the host device is processed by the virtual file system and passed to the deterministic caching module which converts the file level request into a number of block oriented access commands to access a selected number of data sectors on the medium associated with the file level request. A sort priority is assigned to each access command in relation to at least one identified characteristic of the file level request. The access commands are executed in relation to the assigned sort priorities.

21 Claims, 8 Drawing Sheets

DATA STORAGE DEVICE WITH DETERMINISTIC CACHING AND RETENTION CAPABILITIES TO EFFECT FILE LEVEL DATA TRANSFERS OVER A NETWORK

RELATED APPLICATIONS

This application claims priority to U.S. Provisional Application No. 60/335,305 filed Oct. 31, 2001.

FIELD OF THE INVENTION

The claimed invention relates generally to the field of digital data storage systems, and more particularly but not by way of limitation, to an apparatus and method for optimizing the transfer of data between a host device and a data storage device.

BACKGROUND

Block data storage devices store and/or retrieve digital data in the form of blocks which are individually addressable by a host device. Exemplary block data storage devices include hard disc drives, optical disc recorders and players, and magnetic digital tape recorders and players.

Such devices typically comprise a hardware/firmware based interface circuit having a buffer (first memory location), a communication channel and a recordable medium (second memory location). The user memory space of the second memory location is divided into a number of addressable blocks which are assigned host-level addresses (sometimes referred to as logical block addresses or LBAs).

Each LBA typically has a corresponding physical block address (PBA) used by servo control circuitry to align a data transducing head with the appropriate portion of the medium to access the desired LBA.

To write data to the medium, the host device issues a write command comprising the user data to be stored by the storage device along with a list of LBAs to which the user data are to be stored. The storage device temporarily stores the user data in the first memory location, schedules movement of the data transducing head to the appropriate location(s) over the medium, and then uses write channel portions of the communication channel to apply the appropriate encoding and conditioning of the data to write the data to the selected LBAs.

To subsequently read the data from the storage device, the host device issues a read command identifying the LBAs from which data are to be retrieved. The storage device schedules movement of the data transducing head to the appropriate location(s) over the medium, and then uses read channel portions of the communication channel to decode readback data which are placed into the first memory location (buffer) for subsequent transfer back to the host device.

A typical data storage device is configured to concurrently handle multiple pending access (read and write) commands from the host device. The commands are arranged into a command queue and a sort strategy is used to identify a sequence of execution of the pending access commands in hopes of optimizing the rate at which data are transferred between the host device and the data storage device.

A typical sort strategy involves calculating the elapsed time that would be required to move the appropriate data transducing head to the appropriate physical address of the medium in order to service each command. Generally, the access command that can be serviced in the shortest access time is selected from among the command queue as the next command to be executed.

In data storage devices that use rotatable media (discs), the time required for a particular data block to rotate around and reach the head (latency) is an important factor when selecting the execution order, as delays in waiting for the disc to rotate a selected data block around to the data transducing head can significantly decrease the resulting transfer rate.

One way that block data storage devices attempt to reduce the effects of such latency delays involves reading additional, nonrequested data into the buffer while the device waits for the requested data block to reach the head. If the host subsequently requests such data in the future, the data request can be satisfied immediately from the buffer (sometimes referred to as a "cache hit"). Cache hits tend to significantly improve data transfer performance and are therefore highly desirable.

While block data storage devices have been found operable in that such devices accommodate a wide variety of interfaces and host operating systems, a fundamental disadvantage with such devices is the lack of information that such devices have with respect to specific block level requests. A host device typically operates to distill a number of pending file requests (for both user data from user applications and operating system data required for use by the operating system) into an almost random appearing sequence of read and write commands for different blocks of data (LBAs) at different locations within the device memory.

A block data storage device generally has no mechanism to detect and distinguish the specific content of a particular access command, and hence is generally in the dark with regard to which commands should be accessed first, whether additional, nearby data to particular accessed data should be also placed into the buffer and which buffered data should be retained and for how long.

While some data transfer protocols (such as SCSI 3) do allow the host device to specify some measure of priority with a particular access command, such decisions are made at the host level, leaving the device to decide which commands to perform at each priority level and still not addressing the fundamental issues of retention and nonrequested data retrieval for particular commands.

Hence, while block data device manufacturers take great pains to try to develop complex command scheduling and retention policies in an attempt to guess at what data the host may require in the near future, in reality such efforts often provide little if any benefit during actual operation. In some cases such policies have actually been found to be counterproductive and even reduce overall data transfer rates during real world use.

Accordingly, there is a need for improvements in the art to provide effective and efficient data transfer operations with a data storage device that overcomes these and other limitations of existing block data transfer mechanisms.

SUMMARY OF THE INVENTION

In accordance with preferred embodiments, a data storage device (also referred to as a network enabled device, or NED) comprises a data recording medium on which user data are stored in a number of data sectors having data sector addresses. A data transducing head accesses the data sectors during read and write operations.

The NED comprises an operating system kernel module having a virtual file system and a deterministic caching module coupled to the kernel module. The operating system kernel module preferably employs Linux-based open architecture code.

A file level request issued by a host device is processed by the virtual file system and passed to the deterministic caching module. The deterministic caching module converts the file level request into a number of block oriented access commands to access a selected number of the sectors on the medium associated with the file level request, and which assigning a sort priority to each said block oriented access command in relation to at least one identified characteristic of the file level request.

The access commands are thereafter executed in an order determined by the assigned sort priorities using a media interface module.

The deterministic caching module further preferably determines a retention policy for each said block oriented access command to determine whether data retrieved from the medium upon execution of each said block oriented access command is retained in a buffer of the data storage device.

Preferably the deterministic caching module evaluates the file level request to determine whether the file level request comprises metadata or user data, and wherein the deterministic caching module further assigns the sort priorities to the number of block oriented access commands in relation to whether the file level request comprises said metadata or user data.

The data storage device further preferably comprises a network interface module which communicates with the host device over a computer network bus so that the file level request is passed from the host device to the data storage device over said bus.

The data storage device further preferably comprises a mailbox memory module disposed between the operating system kernel module and the deterministic caching module, wherein the file level requests are passed from the operating system kernel module to the deterministic caching module by way of the mailbox memory module.

The NED thus operates with knowledge of the characteristics of each file level request and can therefore better predict future access requests by the host, retrieve the requested data in an order better suited to the needs of the host, and retain priority data for future use by the host or the NED while discarding nonpriority data that will not likely be requested again by the host or used by the NED in the near future.

These and various other features and advantages that characterize the claimed invention will be apparent upon reading the following detailed description and upon review of the associated drawings.

DETAILED DESCRIPTION

Figure 1:
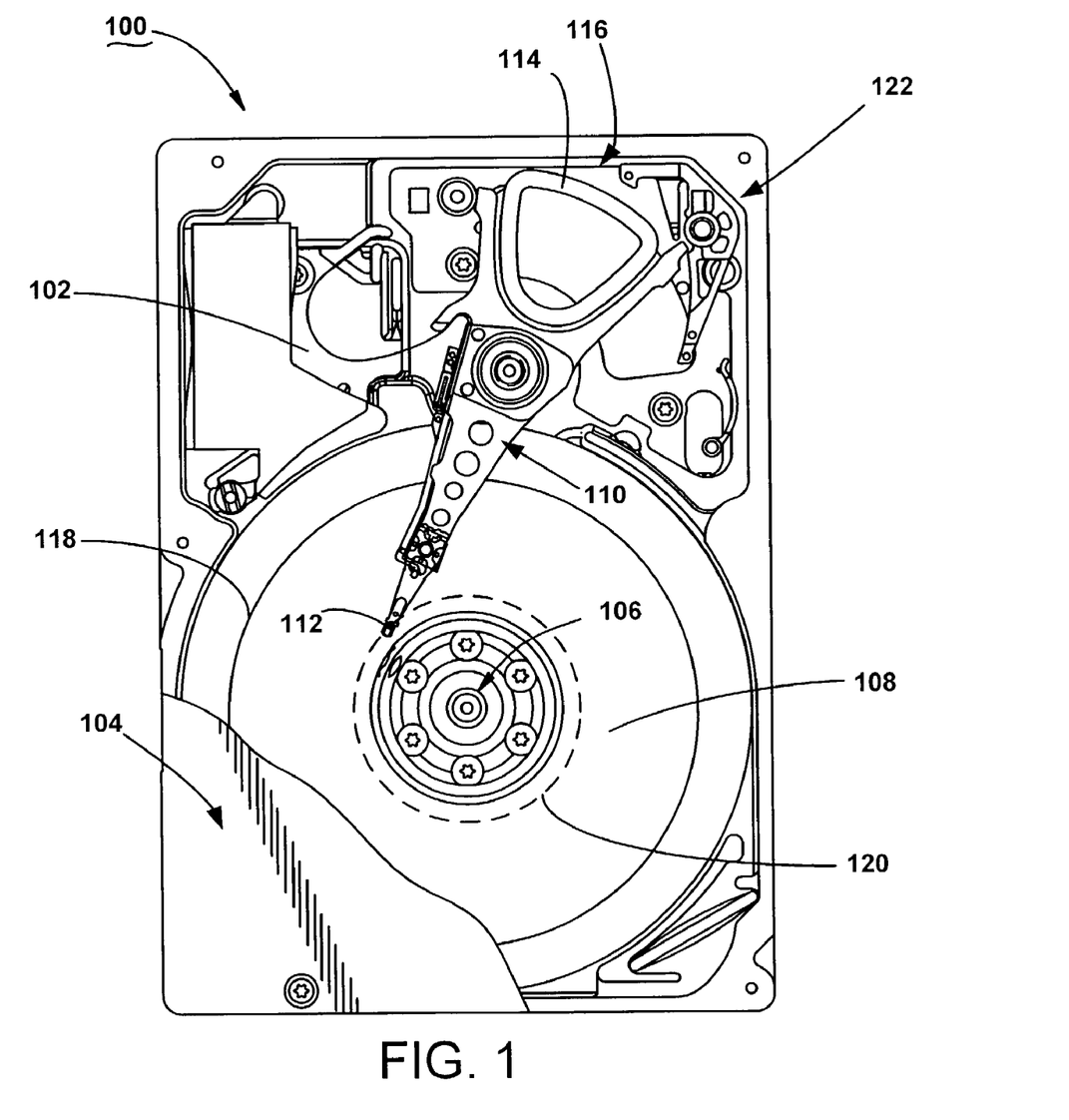
FIG. 1 is a plan view of a network enabled device (NED) constructed and operated in accordance with preferred embodiments of the present invention.

Referring now to the drawings, FIG. 1 provides a top plan view of a file data storage device 100 (also referred to herein as a network enabled storage device, or NED). The NED 100 preferably has a similar mechanical architecture to a disc drive data storage device, but has a substantially different electrical architecture as discussed below.

The NED 100 includes a rigid base deck 102 which cooperates with a top cover 104 (shown in partial cutaway) to form a sealed housing for the device. A spindle motor 106 rotates a number of magnetic data storage discs 108 at a constant high speed. A rotary actuator 110 supports a number of data transducing heads 112 adjacent the discs 108. The actuator 10 is rotated through application of current to a coil 114 of a voice coil motor (VCM) 116.

During data transfer operations with a host device (not shown), the actuator 110 moves the heads 112 to concentric data tracks (one represented at 118) on the surfaces of the discs 108 to write data to and read data from the discs 108. When the NED 100 is deactivated, the actuator 110 moves the heads 112 to texturized landing zones 120 and the actuator is latched by a toggle latch 122. Command and control electronics for the NED 100 are provided on a printed circuit board (PCB) mounted to the underside of the base deck 102.

Figure 2:
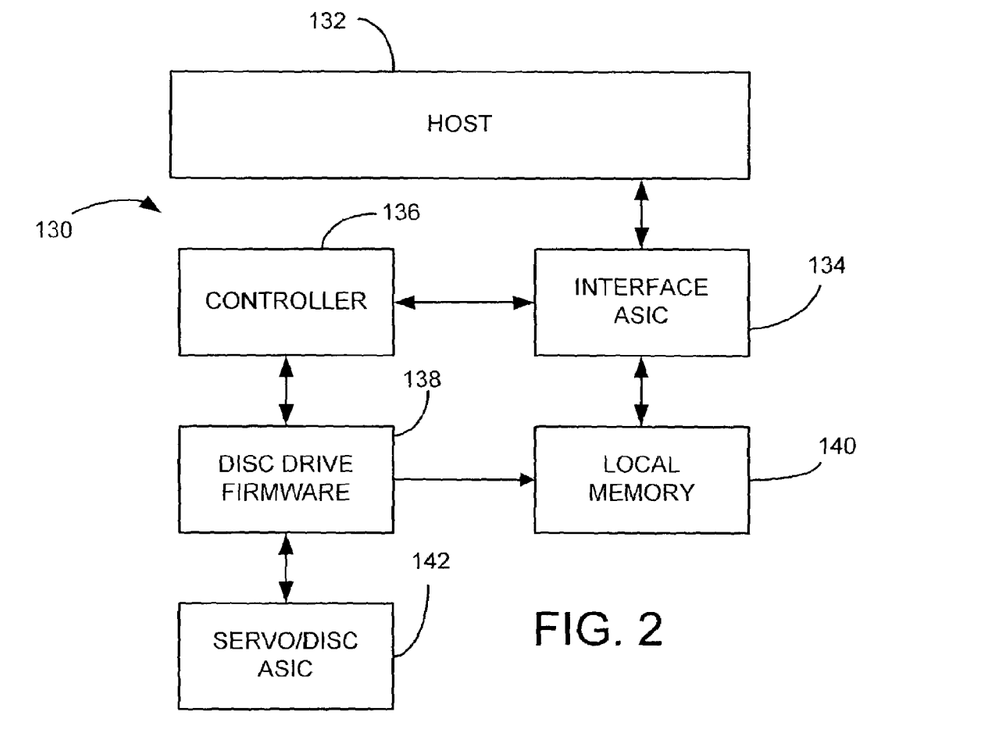
FIG. 2 provides a functional block diagram of the electrical architecture of a block data disc drive.

In order to better understand various aspects of the NED 100 of FIG. 1, it may be helpful to briefly discuss the organization and operation of a typical block data storage device. FIG. 2 provides a generalized functional block diagram of the basic electrical architecture of a disc drive data storage device 130 (disc drive) in conjunction with a host device 132. The disc drive 130 includes an interface application specific integrated circuit (ASIC) 134 which receives block level access commands from the host 132 to access particular logical blocks of the drive.

A top level controller 136 operates in accordance with programming stored in controller firmware 138 to schedule execution of the access commands. A memory location (buffer) 140 temporarily stores data to be written to the disc drive 100 and temporarily stores data returned from the drive pending transfer to the host 132. A servo/disc ASIC 142 includes the requisite communication channel and servo control circuitry to execute the access commands.

Figure 3:
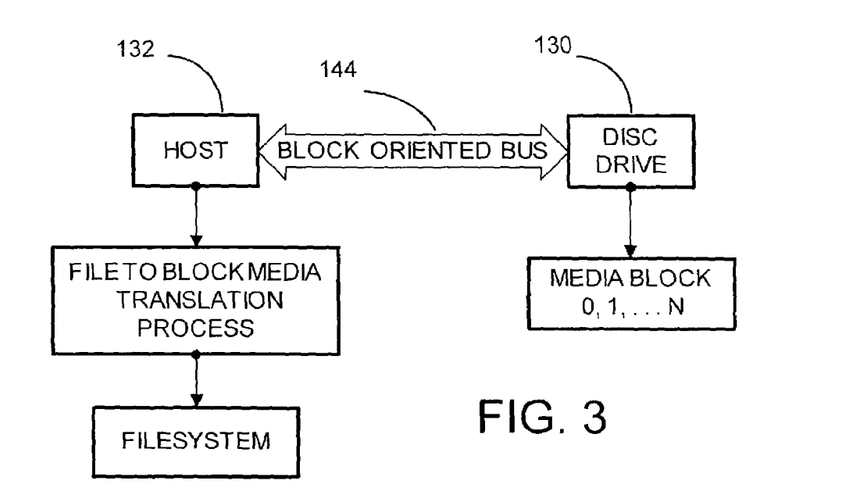
FIG. 3 is a functional representation of the manner in which data transfer requests occur between the disc drive and a host device.

FIG. 3 provides a functional representation of the data transfer mechanism employed between the host 132 and the disc drive 130. In order to transfer data associated with a particular file, the host 132 first performs a transformation from a file system format to a block request format. This results in the transmission of a number of block level access commands to the disc drive 100 through a block-oriented bus 144.

The disc drive 100 converts the block level addresses to physical addresses and either stores the data to disc (write operation) or retrieves the associated data blocks (read operation). During a read operation, upon retrieval of the requested blocks the host 132 reassembles the originally requested file for use by the operating system or a resident application.

Interestingly, the definition and implementation of the host file system exists on the disc drive 130, but knowledge of the organization and contents of the data on the disc drive 130 is isolated to the host 132. The host is solely responsible for making meaningful and efficient requests since the disc drive 130 is not capable of performing these duties.

Accordingly, the disc drive 130 receives only block level requests and attempts from these to predict future host requests. The drive 130 may employ one or more of the following execution scheduling and data retention approaches in an effort to improve response to the block level commands.

Locality: the well-known principal of locality suggests that if data are requested from a given region of the disc, then there is a high likelihood that future requests will reference data in the same area.

To take advantage of the principal of locality, the disc drive 130 will continue reading data from the disc into a disc drive buffer even after a particular request has been satisfied (read look-ahead or pre-fetch). If these non-requested data are subsequently requested by the host, the disc drive 130 can provide the data from cache memory, and in doing this, will eliminate the overhead cost associated with disc media access.

Command queuing: many disc drive interface protocols offer the ability for the disc drive to queue up commands internally, release the physical bus, and then later respond with data or status. This provides the host 132 with an interface that can be timeshared and consequently allows multiple hosts or multiple host processes access to the disc drive 130 in a timely manner.

Disc drive designers take advantage of this queuing interface to improve drive performance. By ordering physical media access based upon the disc locations of multiple pending commands, the disc drive 130 can collect sequential or near sequential data requests and performs a single media transfer instead of performing multiple media transfers. In addition, the disc drive 130 can sort non-sequential pending commands in a manner that minimizes actuator movement and accounts for disc latency to reduce overall access times.

Write command queuing: write command queuing extends the benefits of general command queuing by performing deferred writes through interfaces that do not explicitly support queuing. In this case, the disc drive 130 reports command completion for a write request even though the write data may not have been committed to media. However, there exists an inherent danger in this activity since a failure to actually commit data to non-volatile storage can occur when power failure or non-recoverable write fault occurs.

If the data are important then this could lead to catastrophic results for a mechanism relying on the saved data. On the other hand, if the data are not vital, then this approach offers a performance enhancement with little cost. The problem is that the disc drive 130 cannot generally distinguish between vital and non-vital data. Because of this, typically the host 132 is responsible for telling the disc drive whether queuing or write caching is allowed.

Heuristic modeling: disc drive developers often run standard benchmarking tests on a new disc drive design and adjust the firmware algorithms to improve performance when running these tests. A problem facing developers is the algorithms that result in good test performance risk actually reducing performance in non-test environments.

Some designers actually configure disc drives to recognize when a particular benchmark test is being employed and use different execution parameters tuned for that specific test to achieve improved benchmark results. This is not simple since the disc drive host interfaces do not provide this sort of information. Moreover, this approach tends to skew real world performance expectations for the disc drive 130.

User environments present similar problems and various solutions have developed for improving the caching retention and command sorting by using past command mix behavior to predict future behavior. The results from these initiatives have been mixed. At times customer environments can present the drive with command sequences that appear almost random in nature (although perceived randomness may be a result of not understanding the underlying pattern associated with the requests).

A dilemma facing disc drive developers is that existing command sorting and cache retention policies are essentially non-deterministic. This limits the ability of the disc drive 130 from providing predictable performance in all cases since existing approaches are based upon statistical likelihood of future host request streams instead of actual knowledge. When the developed model characteristics are not evident in the command stream, the firmware will typically resort to simply reacting to commands, yielding non-optimal performance.

Figure 4:
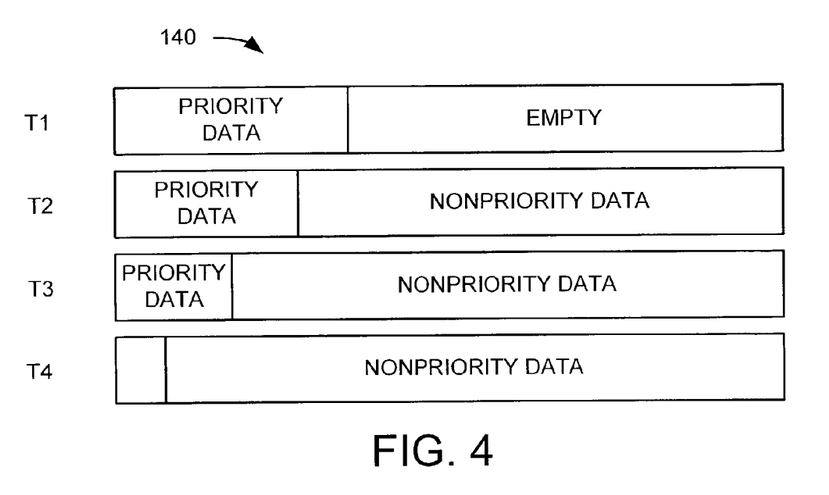
FIG. 4 is a generalized timing diagram to illustrate drawbacks associated with the disc drive of FIGS. 2 and 3.

The lack of contextual information can further adversely affect the effectiveness of the disc drive 130 in retaining cached data in the buffer 140. A typical caching scheme treats most resident data as having equal priority and generally bases the retention policy on the length of time a segment of data has resided in memory. This scheme in many cases is inadequate at best and completely wrong in others. FIG. 4 provides a simple cache memory example to illustrate this point.

FIG. 4 represents the contents of the buffer 140 of the disc drive 130 at successive times T1 through T4. As represented at time T1, the host 132 has requested selected data and the drive 130 has provided such to the host 132. Unbeknownst to the drive 130, the data represent high priority data to the host 1132. The drive 130 has further retained the data in the buffer 140 in anticipation that the host 132 may request the data again. This is initially reasonable since no other data currently reside in the buffer 140 at this time and, if the host 132 does happen to request the data again, the drive 130 can return the data quickly from the buffer 140 instead of from the discs 108.

However, over time (as represented by time steps T2–T4) additional commands are provided to transmit what can be considered to be nonpriority data to the host 132. As before, the drive 130 attempts to retain the nonpriority data in the buffer 140 in hopes of obtaining cache hits in the near future for the data.

However, because the drive 130 cannot distinguish between what is actually important to the host and what is not, the priority data within the buffer 140 are eventually overwritten with unimportant nonpriority data.

An important question, then, is what makes data priority versus non-priority? The following factors can offer a general guide for identifying priority data:

1. Data that describe what access requests the host is planning to make in the future are useful.
2. Data that describe what access requests the host will not make in the near term are useful.
3. The identity of the application requesting the data transfer is useful (data base, web page, system file request, etc).
4. The identity of the owner of the data is useful (are requests from the same process or different processes?)

Identification of data as priority data would allow the drive firmware to make intelligent decisions concerning retention of past data and anticipation of future data. However, existing block-oriented interfaces do not support this type of information exchange.

Accordingly, the NED 100 of FIG. 1 overcomes these and other limitations by providing deterministic data caching and retention policies. These policies are preferably based on actual knowledge of host operating system kernel, file system and process attributes. A detailed description of the manner in which the NED 100 carries out such policies will be discussed below after a brief review of the bases upon which such policies operate.

The host operating system kernel determines what storage data requests are presented based upon a complex mix of process scheduling and resource allocation priorities. Host operating systems typically cache system information recovered from a disc drive in addition to providing processes with user data.

Providing device level firmware with operating system kernel attributes allows a developer to tune device operation based upon the dynamic characteristics of the host system. Useful attributes include whether the system supports single or multiple users, whether it is real time, preemptive or cooperative and so on.

Differentiating between system data and user data further allows the NED 100 to modify sorting and retention policies over time. For example, if the request involves process swap data, then the cache retention policy may be inverted compared to user data cache retention policy. If the kernel uses a round robin process prioritization for a given priority level, then it may be more efficient to cache the least recently accessed data rather than the most recently accessed data.

Knowing the underlying software application a process represents (e.g., a Word® document) offers an opportunity to optimize caching and sorting. For example, if the process requesting storage is a web service, it may be more efficient to return only parts of the requested data in order to reduce latency for multiple clients and provide faster apparent response from the user point of view. Knowing what application has requested the file further allows the NED 100 to identify and prefetch particular data that will likely be associated with the request.

The kernel priority assigned to a process further enables the NED 100 to schedule the data request in a way that is compatible with the needs of the user and in doing so, reduce latency for high priority applications. This is important when the NED 100 has queued previous commands and a new, higher priority command is received.

An awareness of what file system a request is associated with is another notable system attribute the NED 100 preferably exploits. File systems describe the location and meaning of the data stored in the user accessible areas on the discs 108. Generally, every host request is made in the context of a particular file system.

Linux is a well known open source operating system that supports many popular file systems. Each file system stores data on the discs 108 in a manner that is optimized for specifically stated goals. For example, some systems are designed for high performance recovery of video and image data, while others are designed for recovery of small files, such as those found on web servers. Linux allows any number of different file systems to be concurrently mounted.

The NED 100 preferably uses a Linux based operating system kernel to carry out deterministic caching using a virtual file system (VFS). This virtual file system provides a generic organization and interface based upon common structure elements. This allows the NED 100 to employ similar firmware solutions to accommodate different data organizations.

Figure 5:
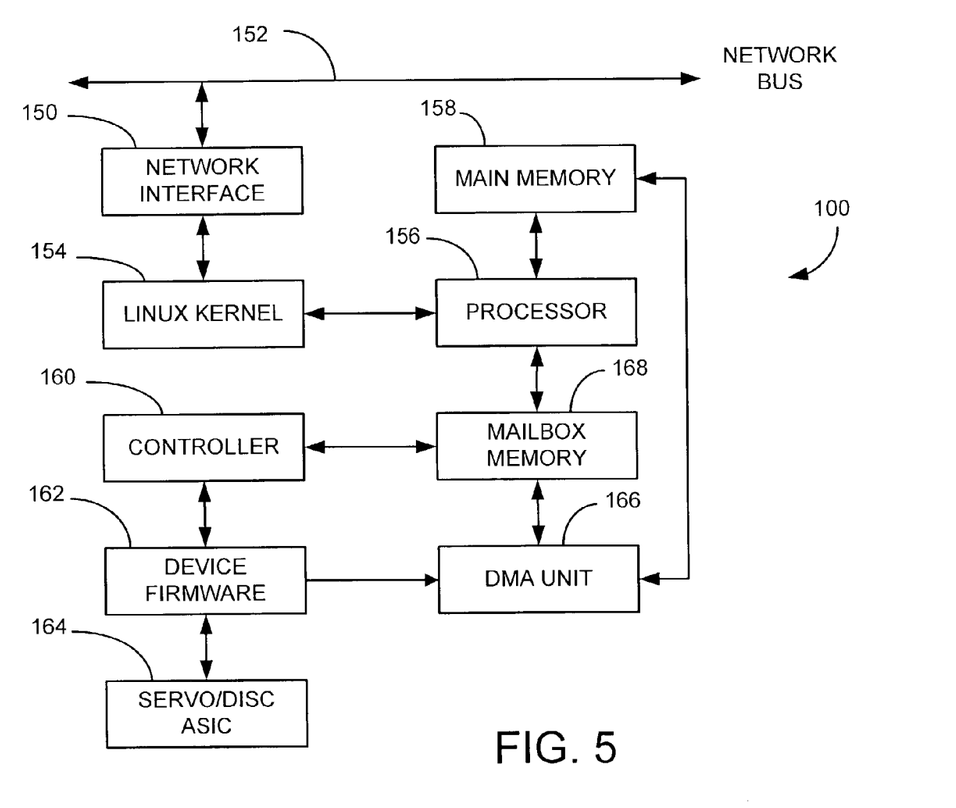
FIG. 5 provides a functional block diagram of the electrical architecture of the NED in accordance with preferred embodiments of the present invention.

FIG. 5 provides a functional block representation of a preferred electrical architecture of the NED 100 of FIG. 1. It will be noted that the NED 100 includes elements that are similar to those of the disc drive architecture of FIG. 2.

A network interface block 150 communicates with a standard network bus 152 using a conventional communication protocol (such as Ethernet). A Linux kernel block 154 embodies a real time version of the open source Linux code and is commercially available from a number of Linux vendors at nominal cost. The kernel block 154 is executed by a top level processor 156 having top level memory 158. The kernel block 154 further performs low-level operating system tasks such as managing memory and running user processes.

A low level controller 160 operates in conjunction with firmware 162, a servo/disc ASIC block 164 and a direct memory access (DMA) unit 166. The interface between the top level processor 156 and the low level controller 160 is carried out using a mailbox memory block 168. The protocol for this interface is file-oriented rather than block-oriented.

Each file system operation made by the kernel on behalf of a user or system process is passed to the mailbox interface and acted on by the disc drive operating firmware 162. An advantage of the use of the mailbox memory 168 instead of purely shared memory is to allow the firmware to operate in parallel with the kernel by decoupling the respective use of a common resource.

The DMA unit 166 provides a DMA channel into the Linux kernel 154. This channel is used for transferring user and system data to and from the discs 108. The Linux kernel provides a DMA memory region for this purpose.

Figure 6:
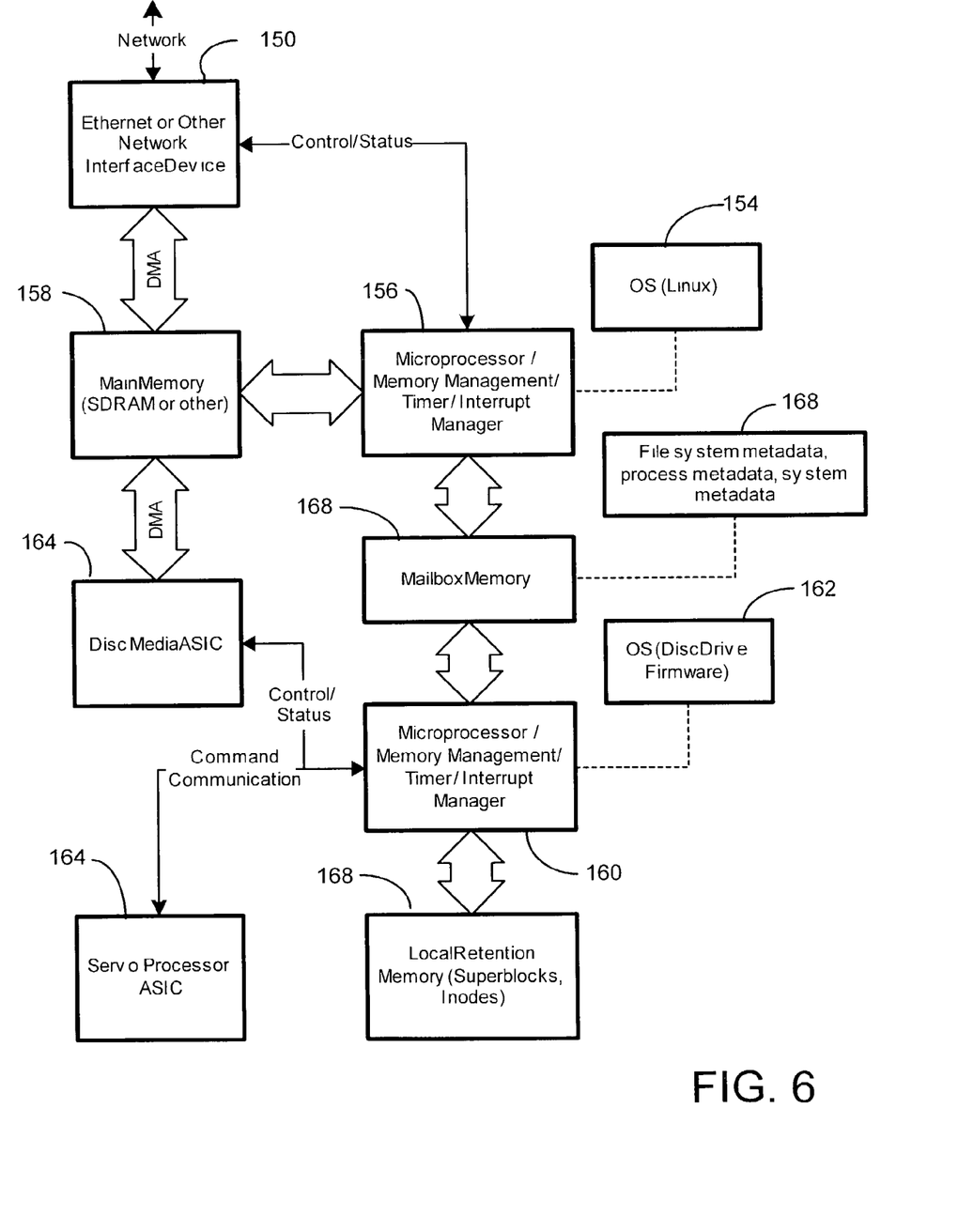
FIG. 6 shows the manner in which the NED carries out deterministic caching in greater detail.

FIG. 6 provides a more detailed illustration of the architecture of FIG. 5 to better illustrate the manner in which the NED 100 performs deterministic caching.

Generally, file level requests are received by the network interface 150 and processed by the Linux kernel 154 to fashion appropriate mailbox requests which are placed into the mailbox memory 168. The controller 160 analyzes the requests and performs an optimal series of block accesses to service the request as well as to prefetch additional data that will be useful in the near term for enhancing overall performance. This operation will be explained in greater detail below.

At this point, it should be noted that the deterministic caching performed by the NED 100 relies on a distinction between two types of data maintained by a file system: regular (user) data and metadata. Regular data refers to data that belongs to user and system processes. These data contain information that has private scope to processes and is not of direct interest to the kernel or the disc drive operating firmware.

Metadata provides information about the file system. This includes the organization, location, privileges and size of the regular data blocks. Metadata provides information for the deterministic caching methods.

The virtual file system provides a common file interface to the kernel and indirectly to processes maintained by the kernel. Although many file systems are supported by the virtual file system, all systems are managed using the same general functions, macros and system calls.

Since file system particulars vary greatly from file system to file system, the virtual file system provides hooks for system implementers to use for implementation of file system specific operations. The deterministic caching approach uses these hooks to provide useful, file-level information to the firmware 162.

The deterministic caching approach further relies on access to several attributes available from the Linux operating system: file system metadata, process metadata and system metadata. File system metadata are attributes describing the relationship of data to the file system. These include file system type, location, extent, block organization, name, directory attributes and other descriptive information.

Process metadata are attributes that describe the relationship of data to the current operating process. These include priority, application identity, whether the owner is the system or user, etc.

System metadata are attributes that describe the relationship of data to the system that serves as client to the deterministic caching firmware. These include, scheduling policy, application environment (web server, for example), data/metadata caching policy, swapping policy, etc. These attributes preferably are among the inputs from the Linux kernel block 154 to the firmware 162.

Figure 7:
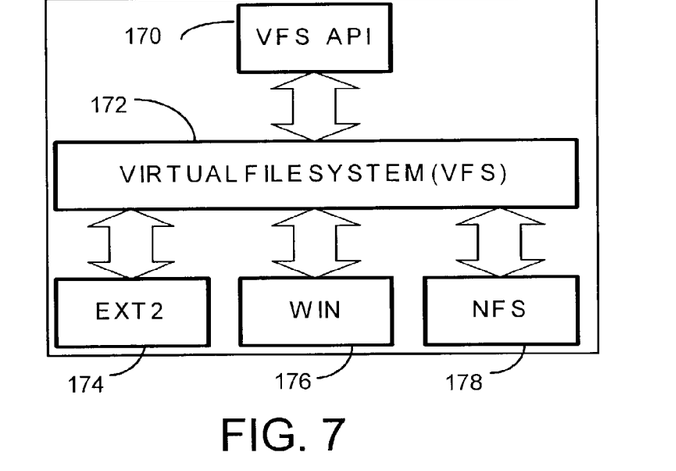
FIG. 7 represents the virtual file system (VFS) of the NED.

FIG. 7 generally illustrates the structure of the virtual file system. A virtual file system application program interface (VFS API) block 170 provides a single point of entry for all Linux file system operations. The virtual file system is implemented as a protected set of kernel operations (block 172). Each of the particular file systems shown (EXT2, Windows®, NFS, blocks 174, 176, 178 respectively) are extensions, through VFS hooks, that provide the particular services giving each file system its individual personality.

Figure 8:
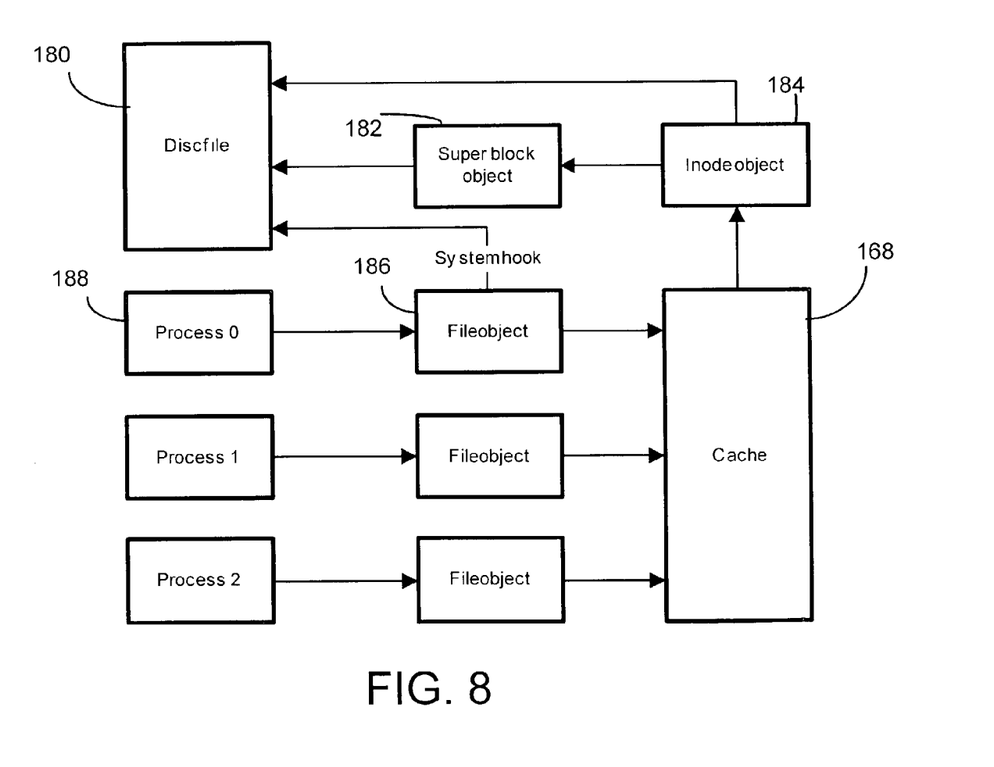
FIG. 8 generally represents the manner in which hooks are used by the VFS to parse and advance portions of a file level request.

FIG. 8 generally illustrates the general nature of the virtual file system architecture to show how a process, through an open file object and other file system objects, locates and accesses a disc file. In FIG. 8, the disc firmware interface (via mailbox memory 168) is represented as a disc file block 180. A file request is broken into a superblock object 182, inode objects 184 and file objects 186 (as explained below), with a different process (block 188) performed in relation to each file object.

Note the existence of the system hook arrow, which presents the disc drive firmware 162 with the identity, location or contents of the file objects, inode objects and super block objects. The required information will vary depending upon whether or not the firmware has been notified in the past (if so, the file is open). In this way, the disc drive firmware 162 is a party in the management of files, not just raw block data.

Supported Linux file systems generally all have certain organization and structural aspects in common, but differ in optimization and features. This allows a particular file system to excel in certain environments but perform poorly in others. Main differences between different file systems include the organization of the data and metadata and whether journaling (logging) is supported. These differences, along with the typical mix of applications using these different systems account for differences in the behavior and nature transfer requests seen by the NED 100.

Figure 9:
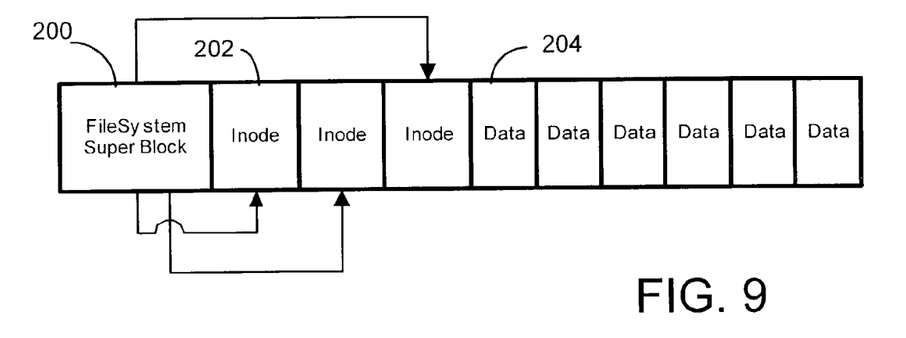
FIG. 9 shows a generalized format for a file level request to include metadata (including a superblock and inodes) and user data.

FIG. 9 generally illustrates the typical disc blocks organization of a Linux file system. Each file generally comprises a superblock 200, one or more modes 202, followed by data blocks 204. Generally, the superblock 200 describes the particular file system, the inodes 202 are intermediary files (analogous to directories with pointers) and the user data blocks 204 represent the process data to be written to or read from the discs 108. The superblock 200 and inodes 202 are stored on the discs 108 as metadata. The data blocks 204 are stored on the discs 108 as regular data.

Figure 10:
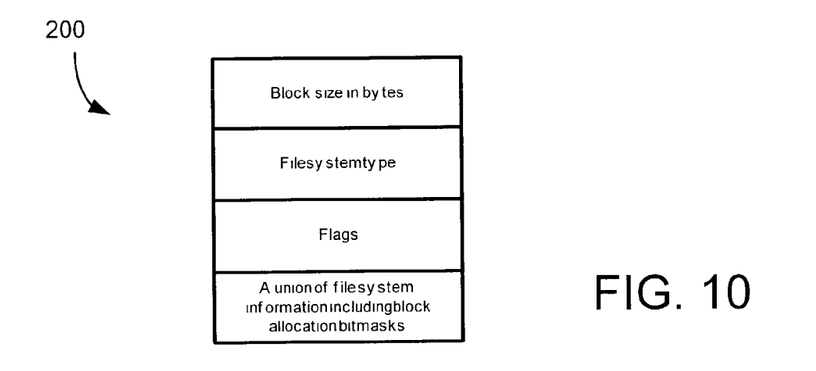
FIG. 10 shows the general format for a typical superblock.

Generally, a file system contains a single superblock. As shown in FIG. 10, the superblock 200 includes fields identifying the particular file system and a number of pointers to routines to be executed by the kernel. Examples include:
1. read_inode( )—identifies the inode to be read from disc. The storage firmware can use this information to identify the object being read as an mode and then use the inode to predict which logical disc blocks will be requested.
2. write_inode( )—identifies an inode to be updated on disc. This can be used by the NED storage firmware to predict what logical disc blocks will be written.
3. put_inode( )—releases an inode from kernel memory if no processes are using the file. This can be used by the NED storage firmware to release a locally cached.
4. delete_inode( )—deletes the data blocks associated with an inode and clears the inode. This can be used by the NED storage firmware to identify disc blocks that will not be read by the host.
5. Write_super( )—writes the file system superblock to disc. The NED storage firmware can use his information to review current cached metadata.

The modes 202 store general information about a specific file or directory. Each inode 202 is identified by an inode number, which uniquely identifies a file within a file system. An inode contains a number of structures that identify and define a particular file including time stamp, file name, file length, and version. Generally, a first inode 202 points to the second, and the second points to the third, and so on until the final inode (when multiple inodes specify a particular file) points to the user data blocks 204.

The kernel maintains a number of methods used for manipulating modes including the following:
1. create( )—creates a new disc inode for a regular file. This is associated with a deentry object (directory object) maintained by the kernel in kernel memory.
2. lookup( )—searches a directory for an inode corresponding to the filename. This can be used by the NED storage firmware to anticipate a future disc request.
3. mkdir( )—creates a new inode for a directory. Invocation of this method indicates that a disc operation can be anticipated.
4. rmdir( )—deletes an inode associated with a directory.
5. rename( )—updates an inode with a new file name.

A file stores information about the interaction between an open file and processes. This information generally only exists in kernel memory. Some of the methods used by the kernel to manage and update files are listed below.
1. read( )—read the contents of a file from disc. This method can be used by the NED storage firmware to predict which disc blocks accesses can be anticipated. This is especially useful if the file is fragmented.

2. write( )—updates disc file blocks.
3. readdir( )—returns the next directory entry from a deentry. The NED storage firmware can use this information to speculate about which inodes will be accessed next.

The kernel maintains a great deal of information about each process running on the system. Process information can be passed to the NED storage firmware to help anticipate and evaluate currently cached metadata and to help anticipate future disc file requests.

The kernel further provides several methods for translating a pathname (text) into an inode. These methods can offer hints to the NED storage firmware to help anticipate future inode access requests. As the kernel traverses a pathname, it either has the required inode in cache or needs to get the inode from disc. Passing the results of each pathname parsing operation to the NED storage firmware allows the NED 100 to anticipate the next inode disc access request.

Figure 11:
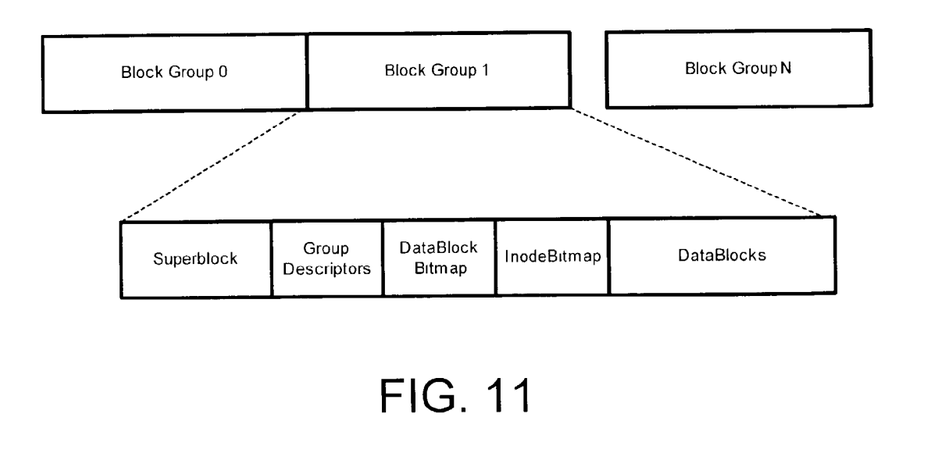
FIG. 11 illustrates how files are arranged as a number of blocks.

EXT2 is the default Linux file system and is used to define the default root mount points for all other file systems supported by the operating system. The file system is organized as N sequential block groups. As illustrated in FIG. 11, each block group generally includes the structures identified in FIG. 9.

The superblock defines the number of allocated and free modes and data blocks and defines the block sizes. Also maintained is the number of blocks per group and number of fragments.

Note that bit maps are used to identify disc blocks in all implementations. Each bit represents a single file system block (usually 4096 bytes in length). An array of bit maps can then be used to identify an array of disc blocks. Generally, a value of one in a bit map represents an allocated, or used, data block and a zero value represents a free data block.

The group descriptors define the block number (relative from the start of the superblock) of a bitmap location (each bit in a bit map indicates a consecutive block) for each of the data block and inode bitmaps. The data blocks area contains both user data and inodes (i.e., the metadata).

A typical disc inode format includes a number of fields including file length, file type, time stamps, file flags, access control information and directory information (if a directory inode). A typical directory inode generally maintains a list of the names of the inodes in the directory and are used for locating a user file.

The NED 100 takes advantage of this knowledge to optimize the command sorting and cache retention policies. Since host requests are for files, the deterministic caching approach makes an informed judgment about which data to retain.

For example, when the firmware 162 detects a request for a super block 200, the super block is transferred and a copy is retained in the local memory 168 since all future requests will relate to this block. The same is true for modes 202. When a file is opened, one or more modes are requested and these are cached until the file is closed. When the file is closed, no further processes will access the modes 202 so the inodes can be safely discarded at this point.

Accesses through the modes 202 allow the deterministic caching to anticipate future data requests since all data locations associated with a file request are known. The same is true for directory inode entries.

Returning again to FIG. 6, the firmware 162 provides the low-level operating code that serves the drive level hardware (ASIC 164) as well as provides the file-oriented interface to the kernel 154 and performs deterministic caching and command sorting algorithms. It is contemplated that existing platform disc drive firmware (such as block 138, FIG. 2) can be readily modified in accordance with the present discussion to add a deterministic caching layer without requiring significant modifications to the underlying firmware architecture.

Figure 12:
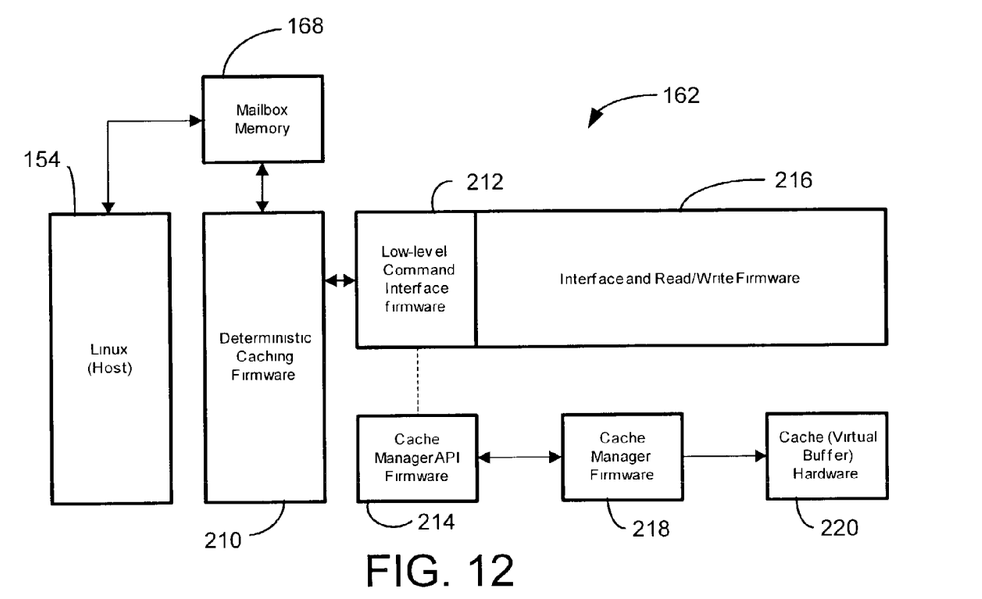
FIG. 12 provides a functional block diagram of firmware of the NED including a deterministic caching module.

FIG. 12 provides a functional block diagram of relevant modules of the firmware 162 in conjunction with the mailbox memory 168 and Linux kernel 154 of FIG. 4. As previously mentioned, the memory 168 serves as a message passing mechanism whereby the interface OS (kernel 154) makes file requests based upon host and local data requests.

The firmware 162 includes a deterministic caching module 210 which responds to each message by evaluating the file level request based upon the factors passed in the message. These factors are parsed and a set of internal block oriented requests is created with appropriate ranking. The block oriented requests are passed to a command interface block 212 and a cache manager API block 214.

These blocks operate to queue the block oriented requests and sort these for execution, as well as determine which data should be retained as the requests are executed. Interface and R/W firmware block 216 controls the actual access operation. Cache manager firmware block 218 allocates the necessary space to place readback data into the buffer using cache (virtual buffer) hardware block 220.

Note that while the firmware 162 may still select execution order for a given number of pending block oriented requests based on how fast the data can be accessed (e.g., sorts by calculating access time for each command in the queue and performing the command having the shortest access time), the sorting algorithm preferably primarily relies on priority levels associated with the requests to aid in selecting an appropriate execution order.

Figure 13:
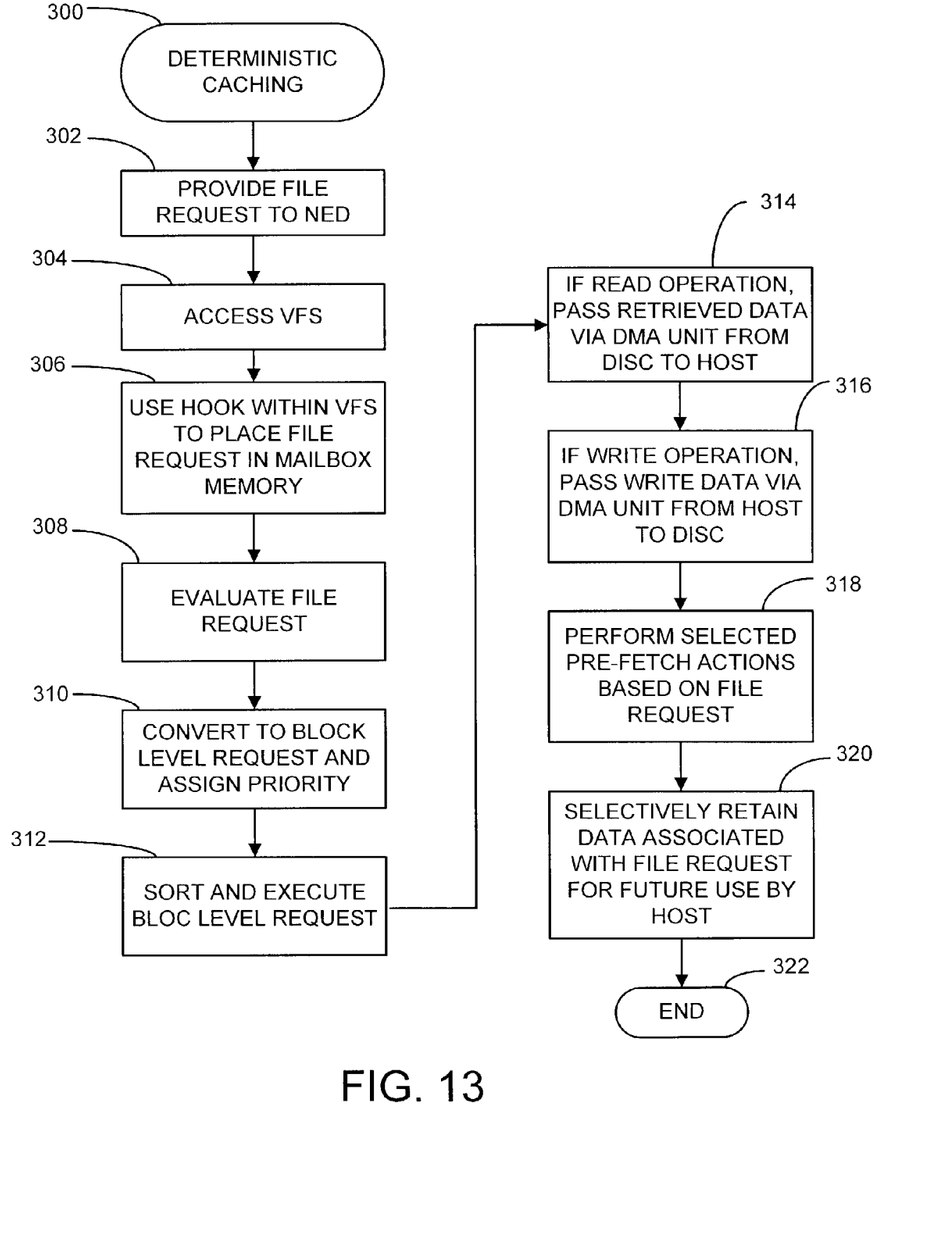
FIG. 13 provides a flow chart for a DETERMINISTIC CACHING routine illustrative of steps carried out in accordance with preferred embodiments to transfer data between the NED and a host device.

FIG. 13 provides a general flow chart for a DETERMINISTIC CACHING routine 300 generally illustrative of steps carried out in accordance with preferred embodiments of the present invention. The routine begins with the transfer of a top level file request to the NED 100 at step 302. An appropriate process within the NED OS (represented by the kernel 154) makes a request to the virtual file system (VFS) at step 304. A hook within the file system places a corresponding file request into the mailbox memory 168 at step 306.

The deterministic caching firmware block 210 (FIG. 12) processes the file request at step 308. More particularly, the block 210 notes the characteristics of the request and determines, for example, whether the request is for metadata or for user data, whether the request involves mounting a new file system (or whether the associated file system has already been mounted), whether the requested data already exists in cache memory, and what are the particular characteristics of the requesting process (e.g., OS request, application request, etc.).

The block 210 accordingly converts the file request into a corresponding set of block oriented requests (access commands) and assigns sorting and cache retention priorities thereto at step 310. The block oriented requests are passed to the low-level command interface firmware block 212 for execution at step 312.

When the access commands are associated with a read operation, as shown by step 314 the firmware block 212 uses the DMA unit 166 (FIG. 4) to transfer the data from the discs 108 to the memory 158 and on to the host device via the interface and R/W firmware 216 and the servo/disc and drive ASIC 164.

This is otherwise generally carried out in a conventional fashion to the extent that the appropriate physical block addresses (sectors) on the discs 108 are accessed, readback signals are generated and conditioned to reconstruct the stored data, error detection and correction codes are employed to detect and correct errors in the retrieved data, etc. It will be noted that the cache manager API firmware block 214 and the cache manager firmware block 218 (FIG. 12) preferably operates at this time to allocate space in the buffer to receive the readback data.

When the access commands are associated with a write operation, as shown by step 316 the firmware block 212 uses the DMA unit 166 to transfer the data to be written from the memory 154 to the discs 108. As before, the firmware block 212 effects this transfer using the R/W firmware 216 and the ASIC 164 to condition and encode the data and write the encoded data to the appropriate sectors.

As shown by step 318, additional pre-fetch operations are also scheduled and executed to readback data based on the likelihood that the host device may require such in the near future. This is preferably determined by the deterministic caching firmware 210. Likewise, step 320 shows that certain data associated with the object level requests are selectively retained as priority data for future use by the NED 100 or the host device.

For example, readback user data returned to the host will preferably not be cached since it is unlikely in many cases that the host will request such data again. On the other hand, superblock data and inode data will preferably be cached as long as a file remains opened since future host requests may involve accessing these blocks. The routine then ends at step 322.

Table 1 illustrates a preferred format of a typical mailbox memory message request passed from the interface OS kernel 154 to the deterministic caching firmware block 210.

TABLE 1

Mailbox format

| Dependent Metadata | Types |
|---|---|
| File information | Super block, Inode, User Data |
| Action | Open, Close, Read, Write, Delete, Create, Touch |
| Process | System, Logging, User, Format, Mount |
| Physical information | Length of requested data, number of processes owning file (user count) |

The mailbox request format provides dependent information to the deterministic caching firmware 212 that is used to make decisions to best schedule and later retain the results of the request. Tables 2–4 generally illustrate the behavior of the deterministic caching mechanism for the general metadata in mailbox requests.

TABLE 2

File metadata type actions

| File metadata type | Deterministic Caching Action |
|---|---|
| Super block | DMA to Host. Retain data. |
| inode | DMA to host. Retain data. Examine inode and determine if this is a directory file or regular file request. If regular file request, determine the length of the file. If different from requested length, cache the difference. If directory inode, determine if additional inodes need to be fetched. If so, access, retain, and |

TABLE 2-continued

File metadata type actions

| File metadata type | Deterministic Caching Action |
|---|---|
| | cache the data. Determine the priority based upon whether subsequent inode accesses are required. |
| User data | Determine which cached inode the user data refers to and look up the user data location and extent. If less data is requested than is available in the file, determine whether to cache additional data based upon process type. |

TABLE 3

Action metadata type table

| Action metadata type | Deterministic Caching Action |
|---|---|
| Open | Fetch anticipated data and assign high priority to cache retention |
| Close | Flush any cached data and delete inode from local retention memory if user count is zero. Otherwise, do nothing. |
| Read | Assign priority based upon process type and prefetch data if more blocks exist than are requested. |
| Write | Assign priority based upon process. If logging or system swap data, assign a low priority. If swap data, flush the most recently accessed data to disc. |
| Delete | Assign low priority. Note that file is to be deleted by marking inode. Wait for host to request inode write. Flush any file data from cache. |
| Touch | Update retained inode and submit for write to disc with a high priority. |

TABLE 4

Process metadata type table

| Process metadata type | Deterministic Caching Action |
|---|---|
| System | Assign priority based upon request type. For logging or swapping, assign low priority. For file system actions such as format or mount requests, assign high priority and retain the results. Prefetch inodes associated with directory inodes and retain these. |
| Logging | Assign low priority. |
| User | Determine whether to break the request into parts based upon what type of process is associated with the data request. The user process may be a data base manager, web server, compile, etc. Each process is modeled in the Deterministic Caching Firmware to determine the optimum access behavior and priority settings. |

Figure 14:
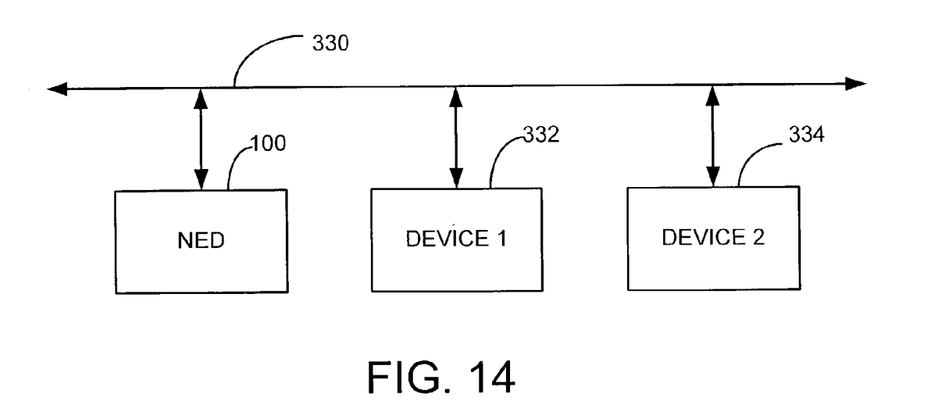
FIG. 14 provides a simplified block diagram showing an environment in which the NED can be used.

FIG. 14 provides a simplified functional block diagram showing the NED 100 operably connected over a network bus 330 to a first device (device 1) 332 and a second device (device 2) 334. The first and second devices 332, 334 can comprise any number of configurations including client personal computers (PCs), local peripheral devices (such as printers), etc. This diagram illustrates the large flexibility of the NED 100 in accomplishing a wide variety of tasks and accommodating a wide number of different operating systems.

It will now be understood from the foregoing discussion that the NED 100 provides several benefits over block data storage devices (such as the disc drive 130 of FIG. 2). First, the preferred use of network busses to communicate and access the NED 100 (such as Ethernet) can allow data transfer rates that are significantly higher than standard data storage device busses (such as SCSI, ATA, etc.). Associated cabling issues are also significantly simpler; a single connection connects the NED 100 to an entire network.

Depending upon the requirements of a given application, host OS processing can be eliminated or reduced, since much of the conversion from files to logical block address formatted requests (see FIG. 3) are eliminated. When the NED 100 is operated as a file server, all that is generally required is to request a particular file and the NED 100 takes over and retrieves the file to the host.

Even if block type requests are presented to the NED, note the ability of the NED to distinguish metadata portions of the request from user data portions of the request. This allows the NED to see where the host is going and prefetch data that will be requested in the near future without wasting effort in prefetching nonpriority data.

Another benefit is the fact that multiple calls to the NED can be eliminated based on a given file request. It may not be readily apparent to the general public just how involved it can be to get a particular file from a disc drive (such as 130). The host OS typically uses file allocation tables (FATs) and/or other manager mechanisms to distill a file request down to a given set of LBAs. However, current generation disc drives can have many millions of LBAs. This prevents the host OS from maintaining a record locally of what LBAs are associated with every file stored on the device, since the required memory for the host device would be excessively large and impractical.

Thus, to access a particular file the host may first issue a superblock request, and from that issue a request for a first inode, and from that issue a request for a second inode, and so on until the LBAs for the actual user data are identified. The host can then issue one (sometimes more) requests for the particular LBAs associated with the user data.

Since metadata (superblocks, inodes) are usually not stored in adjacent LIBAs on the discs 108, performing pre-fetching of adjacent data during a metadata request makes no sense and almost will certainly not result in a cache hit. Nevertheless, disc drives cannot generally distinguish between metadata and user data and so blindly pull additional, unnecessary data into cache, slowing down the process and overwriting priority data that will be requested again by the host.

On the other hand, the NED 100 can readily detect and distinguish metadata and user data, and will preferably retain metadata in cache and discard user data (since the host will likely re-request at least certain modes while the file is opened and will almost certainly not re-request user data already provided to the host).

Another related benefit is in the scheduling of block oriented requests (access commands). It will be recalled that the electrical architecture of the NED 100 is preferably layered over an existing disc drive architecture, so that once the NED 100 processes incoming file level requests, the NED proceeds in a somewhat conventional fashion to generate and sort a command queue of block level access commands. However, the NED 100 is not merely a file server PC in a disc drive form factor; rather, the deterministic caching aspects enable the NED 100 to perform substantially different and improved block access command sorting and data retention.

More particularly, as discussed above disc drives (such as 130) typically sort and execute a stack of pending access commands based on which commands can be accessed first, based on position of the heads 112 and rotational latency of the discs 108. By contrast, the sorting and execution of commands by the NED 100 is based on one or more identified characteristics relating to the content of the blocks associated with each command. Thus, the NED 100 will not necessarily access the blocks that can be reached first, but will rather access blocks in an order that best suits the needs of the host.

An advantage of this latter approach is another apparent increase in the speed and efficiency of the NED 100. Note that a typical user of the disc drive 130, when launching an application and/or opening a file, encounters a "delay" while the host device 132 makes the necessary calls to the disc drive 130 and the disc drive services such calls. Such delays may take several seconds and users seem to accept this, even with latest generation computers with highly advanced host processors. It has become almost a fact of life that computers take some measure of time to react, and the larger the file, the longer it takes to open it.

However, the NED 100 can eliminate substantial amounts of such delays, even if the actual data transfer rate between the host and the NED 100 is not significantly different than that between the host and a conventional drive. This is because the NED can provide the data in an order tailored to the way that a human can relate.

For example, if a large application file is requested having header, text, tables and graphics, the NED can return the portions of the file in such a way that the user immediately receives the header and text information followed by the table and graphics data. Or, the NED can provide all of the data that the user can see on the opening screen and continue to append the rest of the data faster than the user can scroll down. Multiple client requests for the same file can be handled in the same way. The possibilities for improved performance are numerous and can be achieved with little or no modification to existing host OS and application software.

It will now be understood that the present invention (as embodied herein and as claimed below) is generally directed to an apparatus and method for transferring data with a host device.

In accordance with preferred embodiments, a data storage device (such as the NED 100) comprises a data recording medium (such as the discs 108) on which user data are stored in a number of data sectors having data sector addresses. A data transducing head (such as 112) accesses the data sectors during read and write operations.

The data storage device preferably comprises an operating system kernel module (such as 154) having a virtual file system (such as 170, 172, 174, 176, 178) and a deterministic caching module (such as 212) coupled to the kernel module. The operating system kernel module comprises a Linux-based open architecture code module.

A file level request issued by a host device (such as 332, 334) is processed by the virtual file system (such as by steps 304, 306) and passed to the deterministic caching module.

The deterministic caching module converts the file level request into a number of block oriented access commands to access a selected number of the sectors on the medium associated with the file level request, and which assigning a sort priority to each said block oriented access command in relation to at least one identified characteristic of the file level request (such as by steps 308, 310).

The access commands are thereafter executed in an order determined by the assigned sort priorities (such as by step 312) using a media interface module (such as 212, 216).

The deterministic caching module further preferably determines a retention policy for each said block oriented access command to determine whether data retrieved from the medium upon execution of each said block oriented access command is retained in a buffer (such as memory 158, 168) of the data storage device (such as by step 320).

Preferably the deterministic caching module evaluates the file level request to determine whether the file level request comprises metadata (such as 200, 202) or user data (such as 204), and wherein the deterministic caching module further assigns the sort priorities to the number of block oriented access commands in relation to whether the file level request comprises said metadata or user data.

The data storage device further preferably comprises a network interface module (such as 150) which communicates with the host device over a computer network bus (such as 152, 330) so that the file level request is passed from the host device to the data storage device over said bus.

The data storage device further preferably comprises a mailbox memory module (such as 168) disposed between the operating system kernel module and the deterministic caching module, wherein the file level requests are passed from the operating system kernel module to the deterministic caching module by way of the mailbox memory module.

For purposes of the appended claims, reference to at least one identified characteristic of the file level request will be understood consistent with the foregoing discussion to include any number of attributes of the file level request relating to the content of the associated data blocks, including whether the request is for metadata or user data, whether the request identifies superblock or inode data, the actions, processes and owner of the request, etc.

Moreover, it will be understood that the identified characteristic will not be simply the logical block address(es) of a block level access command, a host generated priority level flag (as with SCSI 3, etc.) or other similar data currently used by conventional block data storage devices (such as the disc drive 130) since such do not relate to the content of the associated data blocks.

Further for purposes of the appended claims, the recited first means will be understood as corresponding to the NED 100 including the structure shown in FIG. 4 which carries out the routine of FIG. 13. The first means will be explicitly defined to exclude the disc drive 130 as well as a file server comprising a personal computer (PC) and a conventional disc drive, since these and other structures fail to carry out the deterministic caching and retention steps disclosed herein.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the data transfer routine without departing from the spirit and scope of the present invention.

In addition, although the embodiments described herein are directed to the transfer of data using a substantially disc drive based NED, it will be appreciated by those skilled in the art that the process can be used in other types of data storage devices without departing from the spirit and scope of the claimed invention.

What is claimed is:

1. A method for transferring data between a data storage device and a host device, the data storage device storing data blocks on a data storage medium, the method comprising:
receiving a file level request from the host device, the file level request associated with a host level file corresponding to a selected number of the data blocks on the storage medium;
using the data storage device to identify at least one characteristic of the file level request relating to a content of said data blocks; and
performing a deterministic caching operation by converting the file level request into a number of block oriented access commands to access the selected number of data blocks, assigning a sort priority to each said block oriented access command in relation to the at least one identified characteristic, and executing the number of block oriented access commands in an order determined by the assigned sort priorities.

2. The method of claim 1, wherein the using step comprises determining whether the content of said data blocks comprises metadata or user data.

3. The method of claim 1, wherein the performing step further comprises executing an additional number of block oriented access commands in anticipation of a future, second file transfer request from the host in relation to the at least one identified characteristic of the file level request of the providing step.

4. The method of claim 1, wherein the performing step further comprises providing readback data to the host in relation to the selected number of data blocks on the medium.

5. The method of claim 4, wherein the performing step further comprises retaining in a local buffer of the data storage device at least selected portions of the readback data, wherein said data are retained in relation to the at least one identified characteristic of the file level request.

6. The method of claim 1, wherein the number of block oriented access commands of the performing step comprises a plurality of access commands including a first access command and a second access command, wherein an elapsed phase time to reach a data block associated with the first access command is less than an elapsed phase time to reach a data block associated with the second access command, and wherein the second access command is executed prior to the first access command.

7. The method of claim 1, further comprising providing the data storage device with an operating system having a virtual file system, wherein the file level request of the providing step is provided to the virtual file system of the data storage device.

8. The method of claim 7, further comprising providing the data storage device with a deterministic caching module in communication with the operating system, and wherein the deterministic caching module performs the performing step in response to processing of the file level request by the virtual file system.

9. A data storage device which services data transfer requests from a host device, comprising:
a data recording medium on which user data are stored in a number of data sectors having data sector addresses;
a data transducing head which accesses the data sectors;
an operating system kernel module having a virtual file system; and a deterministic caching module coupled to the medium, the head and the operating system kernel module, wherein a file level request issued by the host device is processed by the virtual file system and passed to the deterministic caching module which converts the file level request into a number of block oriented access commands to access a selected number of the sectors on the medium associated with the file level request, and which assigns a sort priority to each said block oriented access command in relation to at least one identified characteristic of the file level request.

10. The data storage device of claim 9, further comprising a media interface module which executes the number of block oriented access commands in an order determined by the assigned sort priorities.

11. The data storage device of claim 9, wherein the deterministic caching module further determines a retention policy for each said block oriented access command to determine whether data retrieved from the medium upon execution of each said block oriented access command is retained in a buffer of the data storage device.

12. The data storage device of claim 9, wherein the deterministic caching module evaluates the file level request to determine whether selected data blocks associated with the file level request comprise metadata or user data, and wherein the deterministic caching module further assigns the sort priorities to the number of block oriented access commands in relation to whether said selected data blocks comprise metadata or User data.

13. The data storage device of claim 12, wherein the deterministic caching module further directs retention of data in a buffer, said data retrieved from the medium upon execution of each said block oriented access command when said data blocks are determined to comprise metadata.

14. The data storage device of claim 9, wherein the medium comprises a rotatable data storage disc, and wherein the sectors are arranged on tracks defined on a surface of the data storage disc.

15. The data storage device of claim 9, further comprising a network interface module coupled to the operating system kernel module, the network interface module communicating with the host device over a computer network bus so that the file level request is passed from the host device to the data storage device over said bus.

16. The data storage device of claim 9, wherein the operating system kernel module comprises a Linux-based open architecture code module.

17. The data storage device of claim 9, further comprising a mailbox memory module disposed between the operating system kernel module and the deterministic caching module, wherein the file level requests are passed from the operating system kernel module to the deterministic caching module by way of the mailbox memory module.

18. A data storage device which services data transfer requests from a host device, comprising:
a data recording medium on which user data are stored in a number of data sectors having data sector addresses;
a data transducing head which accesses the data sectors; and
first means for receiving and servicing a file level request from the host device by converting the file level request into a number of block oriented access commands to access a selected number of the data sectors associated with the file level request, assigning a priority to each said block oriented access command in relation to at least one identified characteristic of the file level request, and executing the number of block oriented access commands in an order determined in relation to the assigned priorities.

19. The data storage device of claim 18, wherein the first means comprises:
an operating system kernel module having a virtual file system;
a deterministic caching module coupled to the medium, the head and the operating system kernel module, which receives the file level request from the virtual file system, generates the number of block oriented access commands and assigns the sort priority to each said command; and
a media interface module which executes the number of block oriented access commands in the order determined by the assigned sort priorities.

20. The data storage device of claim 19, wherein the first means further comprises a network interface module coupled to the operating system kernel module, the network interface module communicating with the host device over a computer network bus so that the file level request is passed from the host device to the data storage device over said bus.

21. A data storage device adapted for communication with a host over a network in a distributed storage system, the device comprising:
an operating system module; and
a deterministic caching module coupled to the operating system module for detecting a content identifier of file level commands from the host and converting the file level commands from the host into a prioritized sequence of block oriented access commands based upon said detected content identifier of the file level commands.

* * * * *